US009852200B1

(12) United States Patent
Paulzagade et al.

(10) Patent No.: US 9,852,200 B1
(45) Date of Patent: Dec. 26, 2017

(54) SYSTEMS AND METHODS FOR RESTORING DATA FILES

(71) Applicant: Veritas Technologies LLC, Mountain View, CA (US)

(72) Inventors: Sudhakar Paulzagade, Pune (IN); Chirag Dalal, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 298 days.

(21) Appl. No.: 14/625,032

(22) Filed: Feb. 18, 2015

(51) Int. Cl.
*G06F 17/30* (2006.01)

(52) U.S. Cl.
CPC .............. *G06F 17/30575* (2013.01)

(58) Field of Classification Search
USPC .................. 707/644, 679, 645, 654
See application file for complete search history.

(56) References Cited

U.S. PATENT DOCUMENTS

| 9,483,485 | B1* | 11/2016 | Chockalingam | .... G06F 17/3015 |
| 2010/0107158 | A1* | 4/2010 | Chen | .............. G06F 11/1438 718/1 |

OTHER PUBLICATIONS

"Oracle", http://www.oracle.com/index.html, as accessed Dec. 28, 2014, (Dec. 19, 1996).
"What is Copy Data Virtualization?", http://www.actifio.com/what-is-copy-data-virtualization/, as accessed Dec. 28, 2014, Actifio,(May 25, 2014).
"Legacy Enterprise Computing Documentation", http://www.oracle.com/technetwork/documentation/legacy-ent-computing-193035.html, as accessed Dec. 28, 2014, Oracle, (Apr. 15, 2011).
Cox, Charlie "What is Copy Data and Why is it a Problem?", http://datatrend.com/optimize-it/what-is-copy-data-and-why-is-it-a-problem/, as accessed Dec. 28, 2014, Datatrend Technologies, (May 9, 2013).

* cited by examiner

*Primary Examiner* — Hung T Vy
(74) *Attorney, Agent, or Firm* — FisherBroyles LLP

(57) ABSTRACT

The disclosed computer-implemented method for restoring data files may include (1) receiving a request to restore a data file to a particular point in time, (2) in response to the request, accessing, in a storage device, (a) a backup copy of the data file and (b) at least one log of actions performed on the data file, (3) storing, in a section of memory that has a faster access time than the storage device, a location of each action within the log that was performed on the data file up until the particular point in time, and (4) when restoring the data file to an additional point in time, accessing at least a portion of the locations in the section of memory to identify at least a portion of the actions required to restore the data file to the additional point in time.

17 Claims, 8 Drawing Sheets

Log
216(1)

| Log Block | Action | Data File Block | Date |
|---|---|---|---|
| Block 0 | Action A | Block 0 | 1/1/15 |
| Block 1 | Action B | Block 4 | 1/5/15 |
| Block 2 | Action C | Block 2 | 1/1/15 |
| Block 3 | Action D | Block 1 | 1/4/15 |
| Block 4 | Action E | Block 0 | 1/3/15 |
| Block 5 | Action F | Block 4 | 1/2/15 |

Log
216(2)

| Log Block | Action | Data File Block | Date |
|---|---|---|---|
| Block 0 | Action G | Block 8 | 1/5/15 |
| Block 1 | Action H | Block 6 | 1/3/15 |
| Block 2 | Action I | Block 8 | 1/2/15 |
| Block 3 | Action J | Block 7 | 1/5/15 |
| Block 4 | Action K | Block 9 | 1/3/15 |
| Block 5 | Action L | Block 5 | 1/1/15 |

*FIG. 4*

| | Section of Memory 218 | |
|---|---|---|
| Log | Log Block | Date |
| 216(1) | Block 0 | 1/1/15 |
| 216(1) | Block 2 | 1/1/15 |
| 216(2) | Block 5 | 1/1/15 |
| 216(1) | Block 5 | 1/2/15 |
| 216(2) | Block 2 | 1/2/15 |

*FIG. 5*

SYSTEMS AND METHODS FOR RESTORING DATA FILES

BACKGROUND

Copy data management systems may provide useful and/or important data replication services during software development, testing, recovery, etc. For example, a copy data management system may provide data files, archived logs, and/or additional documents that indicate the state (or steps to reach the state) of a database or other file at certain points in time. Specifically, a copy data management system may store an initial version of a data file and logs that record any subsequent changes made to the data file. To restore a data file to a particular point in time, the copy data management system may apply each recorded change, up until the particular point in time, to the initial version of the data file. Once a particular state of a data file is restored, a user may analyze and/or obtain lost or archived data.

Unfortunately, traditional methods for managing copy data may involve excessive time and/or computing resources. For example, identifying each update or alteration made to a data file may require traversing through multiple archived logs. Conventional copy data management systems may be unable to quickly identify the relevant portions of an archived log within a storage device. In addition, these systems may require such extensive analysis for each restoration process of a certain data file, even if a previous restoration process utilized the same archived logs and initial version of the data file. Therefore, the current disclosure identifies a need for improved systems and methods for restoring data files.

SUMMARY

As will be described in greater detail below, the instant disclosure describes various systems and methods for restoring data files by storing, in a section of fast-access memory, each action (or the location of each action within archived logs) used to restore a data file to a particular point in time. When restoring the same data file to the same or an additional point in time, the systems and methods described herein may identify all or a portion of the actions required to restore the data file within the fast-access section of memory, instead of making multiple trips to a slower-access storage device that stores logs of the actions performed on the data file.

In one example, a computer-implemented method for restoring data files may include (1) receiving a request to restore a data file to a particular point in time, (2) in response to the request, accessing, in a storage device, (a) a backup copy of the data file that represents the data file at a time prior to the particular point in time and (b) at least one log of actions performed on the data file after the backup copy of the data file was created, (3) storing, in a section of memory that has a faster access time than the storage device, a location of each action within the log that was performed on the data file up until the particular point in time, and (4) when restoring the data file to an additional point in time, accessing at least a portion of the locations in the section of memory to identify at least a portion of the actions required to restore the data file to the additional point in time. In some examples, restoring the data file to the additional point in time may include applying the portion of the actions to the data file.

In some examples, the data file may represent a database. In these examples, the log of actions performed on the data file may represent a log of changes made to blocks within the database.

In some embodiments, storing the location of each action that was performed on the data file may include identifying each location by monitoring all input/output through a file system that stores the backup copy of the data file and the log of actions performed on the data file. Additionally or alternatively, storing the location of each action that was performed on the data file may include associating the location with a time at which the action was performed.

In some examples, the additional point in time may represent a point in time prior to the particular point in time. Alternatively, the additional point in time may represent a point in time later than the particular point in time.

In one embodiment, a system for implementing the above-described method may include (1) a reception module that receives a request to restore a data file to a particular point in time, (2) an access module that, in response to the request, accesses, in a storage device, (a) a backup copy of the data file that represents the data file at a time prior to the particular point in time and (b) at least one log of actions performed on the data file after the backup copy of the data file was created, (3) a storage module that stores, in a section of memory that has a faster access time than the storage device, a location of each action within the log that was performed on the data file up until the particular point in time, and (4) a restoration module that, when restoring the data file to an additional point in time, accesses at least a portion of the locations in the section of memory to identify at least a portion of the actions required to restore the data file to the additional point in time. In addition, the system may include at least one processor that executes the reception module, the access module, the storage module, and the restoration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to restore a data file to a particular point in time, (2) in response to the request, access, in a storage device, (a) a backup copy of the data file that represents the data file at a time prior to the particular point in time and (b) at least one log of actions performed on the data file after the backup copy of the data file was created, (3) store, in a section of memory that has a faster access time than the storage device, a location of each action within the log that was performed on the data file up until the particular point in time, and (4) when restoring the data file to an additional point in time, access at least a portion of the locations in the section of memory to identify at least a portion of the actions required to restore the data file to the additional point in time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

FIG. 4 is an illustration of exemplary logs of actions that were performed on a data file.

FIG. 5 is an illustration of an exemplary section of memory that stores the locations of actions within logs that were performed on a data file.

Figure 1:
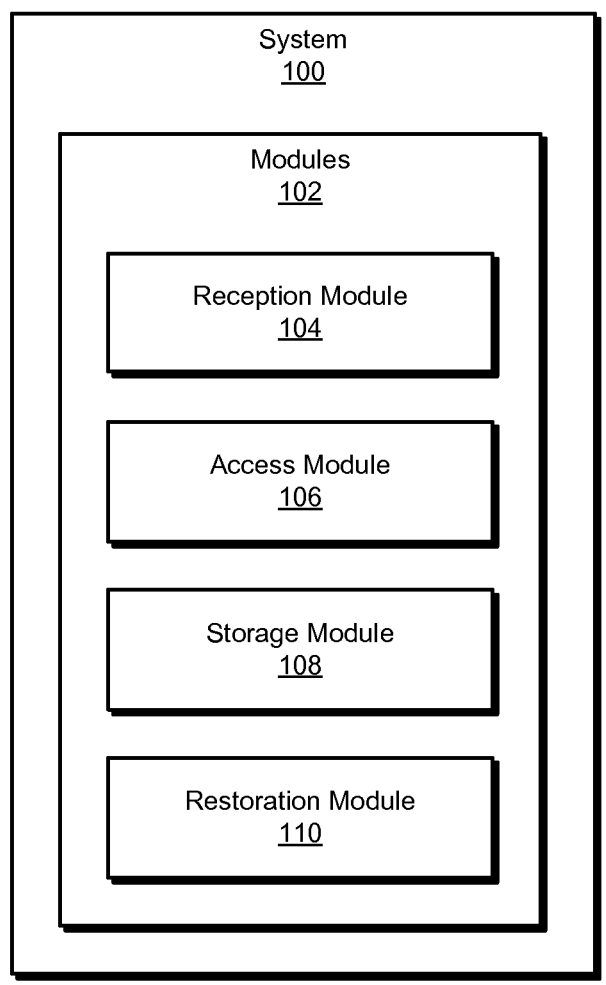
FIG. 1 is a block diagram of an exemplary system for restoring data files.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for restoring data files. As will be explained in greater detail below, after receiving a request to restore a data file to a particular point in time, the systems and methods described herein may access a backup copy of the data file and one or more archived logs that store actions that were performed on the data file after the backup copy was created. Then, the disclosed systems and methods may identify (by, e.g., intercepting file system I/O) the location of each action within the archived logs that is applied to the backup copy to restore the data file to the particular point in time.

By storing each identified location (and/or each action) in a section of memory that has a faster access time than the storage device that stores the backup copy and the archived logs, the systems and methods described herein may efficiently restore the data file to the same or an additional point in time. For example, in response to a request to restore the same data file to another point in time, the disclosed systems and methods may quickly identify, within the fast-access section of memory, the location of at least a portion of the actions required to restore the data file. As such, the systems and methods described herein may increase the speed and efficiency of restoring data files by decreasing the time spent searching through archived logs in a storage device.

Figure 2:
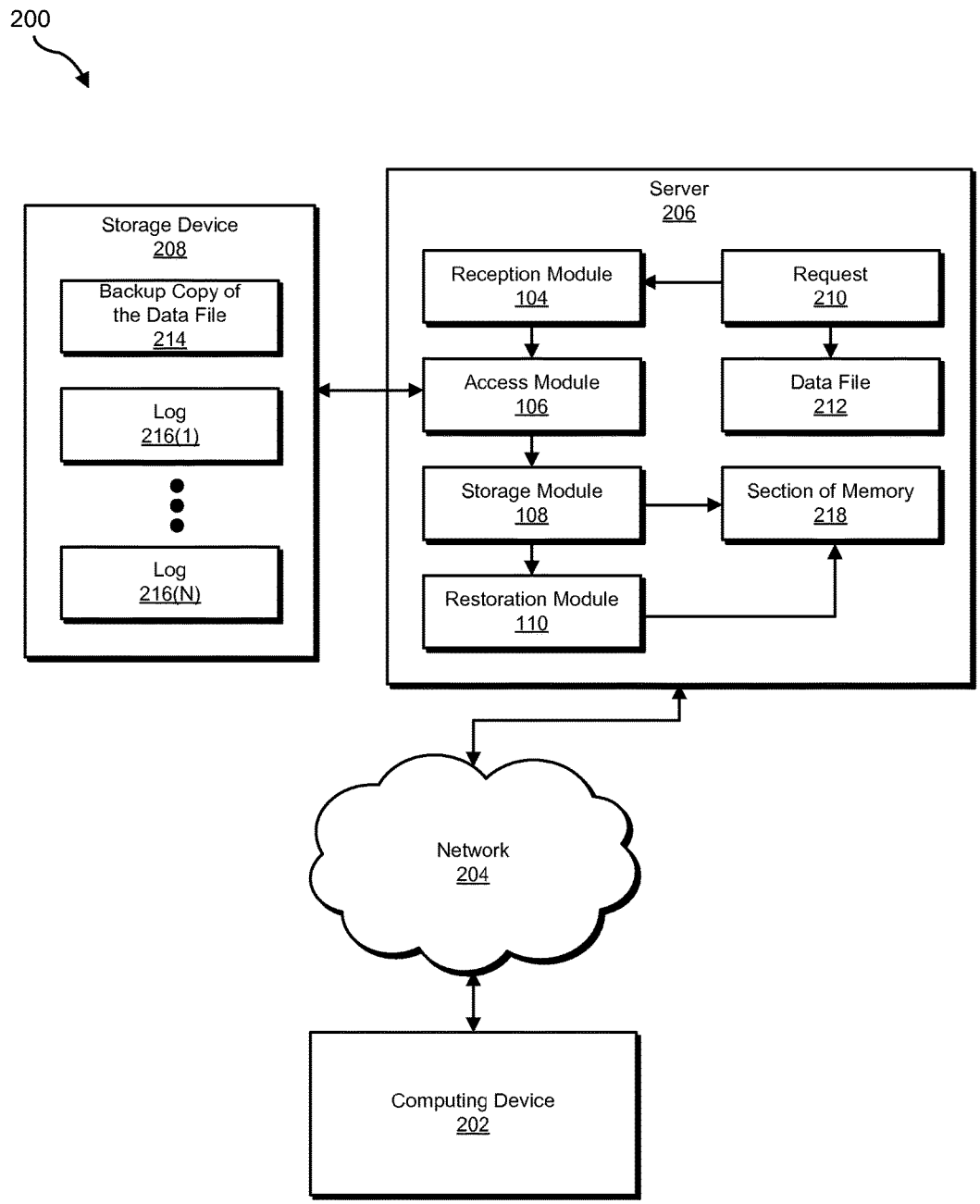
FIG. 2 is a block diagram of an additional exemplary system for restoring data files.

The following will provide, with reference to FIGS. 1 and 2, detailed descriptions of exemplary systems for restoring data files. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for restoring data files. As illustrated in this figure, exemplary system 100 may include one or more modules 102 for performing one or more tasks. For example, and as will be explained in greater detail below, exemplary system 100 may include a reception module 104 that receives a request to restore a data file to a particular point in time. Exemplary system 100 may also include an access module 106 that, in response to the request, accesses, in a storage device, (1) a backup copy of the data file that represents the data file at a time prior to the particular point in time and (2) at least one log of actions performed on the data file after the backup copy of the data file was created.

In addition, and as will be described in greater detail below, exemplary system 100 may include a storage module 108 that stores, in a section of memory that has a faster access time than the storage device, a location of each action within the log that was performed on the data file up until the particular point in time. Finally, exemplary system 100 may include a restoration module that, when restoring the data file to an additional point in time, accesses at least a portion of the locations in the section of memory to identify at least a portion of the actions required to restore the data file to the additional point in time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

In some examples, the systems described herein may operate in the context of a server-side copy data management and/or copy provisioning service. The term "copy data," as used herein, generally refers to any replication or reproduction of the state of one or more data files at previous points in time that may be provided to users for testing, development, data recovery, or similar purposes. A copy data management system may store backup copies of data files (e.g., copies of data files in their original state) and archived logs that record all or a portion of the changes made to the data files. In some examples, a backup copy of a data file and its corresponding logs may be stored in a single backup image. The term "backup image," as used herein, generally refers to any file or collection of files that store one or more backup copies of a data file, logs of actions performed on the data file, and/or any additional data used to identify or restore the data file, such as headers, trailers, and other informational fields.

When a user requests a copy of a data file at a particular point in time, a copy data management service may access the data file's backup image. The service may then identify, within the logs in the backup image, each action that was performed on the data file up until the particular point in time. Each action may indicate an update, addition, removal, or other alteration to the content or input fields of a data file. Next, the service may apply each action to the backup copy in order to bring the backup copy to a state consistent with the particular point in time. In some examples, identifying each required action within the logs may require multiple trips to a slow-access storage device, such as a disk. For example, the copy data management service may have to traverse through several logs stored on a disk and/or randomly read blocks of the logs in order to identify the correct blocks within the logs.

In addition, the term "data file," as used herein, generally refers to any type or form of digital document or collection of documents that may be stored and/or accessed within a server. In an exemplary embodiment, a data file may represent an ORACLE database or other large, commercial, and/or virtual database. Additional examples of data files include, without limitation, text files, binary files, executable files, media files, combinations of one or more of the same, and/or any other type of data file.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Also as shown in FIG. 2, server 206 may be in communication with a storage device 208. In one example, computing device 202 may be programmed with one or more of modules 102 in order to generate and/or identify a request to restore a data file to a particular point in time. Additionally or alternatively, server 206 may be programmed with one or more of modules 102 in order to provide computing device 202 with a copy of a data file that has been restored to a particular point in time.

In one embodiment, one or more of modules 102 from FIG. 1 may, when executed by at least one processor of computing device 202 and/or server 206, enable computing device 202 and/or server 206 to restore data files. For example, and as will be described in greater detail below, reception module 104 may cause computing device 202 and/or server 206 to receive a request (e.g., request 210) to restore a data file (e.g., data file 212) to a particular point in time. In response to request 210, access module 106 may cause computing device 202 and/or server 206 to access, within a storage device (e.g., storage device 208), (1) a backup copy of data file 212 (e.g., backup copy of the data file 214) that represents data file 212 at a time prior to the particular point in time (2) and at least one log (e.g., one or more of logs 216(1)-(N)) of actions performed on data file 212 after backup copy of the data file 214 was created. Next, storage module 108 may cause computing device 202 and/or server 206 to store, in a section of memory (e.g., section of memory 218) that has a faster access time than storage device 208, a location of each action within logs 216(1)-(N) that was performed on data file 212 up until the particular point in time. Finally, when restoring data file 212 to an additional point in time, restoration module 110 may cause computing device 202 and/or server 206 to access at least a portion of the locations within section of memory 218 to identify at least a portion of the actions required to restore data file 212 to the additional point in time.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing, retrieving, and/or manipulating backup copies of data files and/or logs of actions performed on data files. Examples of server 206 include, without limitation, application servers and database servers configured to provide various database services and/or run certain software applications.

In some examples, server 206 may contain and/or be in communication with storage device 208. Storage device 208 generally represents any type or form of computing device or portion of memory configured to store and/or retrieve data. In some embodiments, storage device 208 may represent a physical device such as a hard disk drive, a solid state drive, a universal serial bus drive, a memory card, etc. In other embodiments, storage device 208 may represent a virtual server or database hosted on server 206 and/or an additional server. Additionally, in some embodiments, server 206 may access storage device 208 remotely.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202, server 206, and/or storage device 208.

Figure 3:
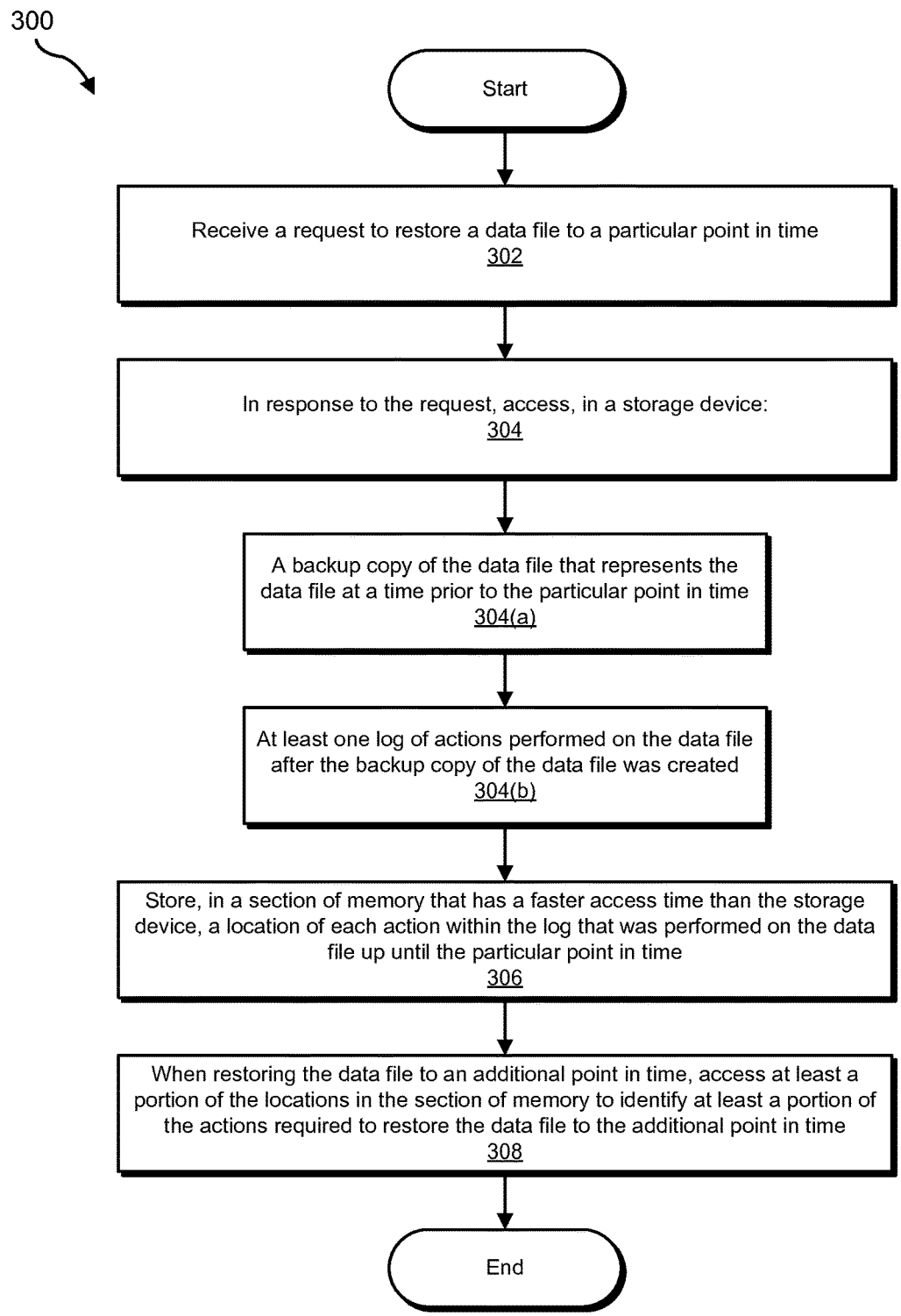
FIG. 3 is a flow diagram of an exemplary method for restoring data files.

FIG. 3 is a flow diagram of an exemplary computer-implemented method 300 for restoring data files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may receive a request to restore a data file to a particular point in time. For example, reception module 104 may, as part of server 206 in FIG. 2, receive request 210 to restore data file 212 to a particular point in time.

The systems described herein may receive a request to restore a data file in a variety of ways. In some examples, reception module 104 may receive, at server 206, request 210 from a user of computing device 202. For example, computing device 202 may transmit request 210 to server 206 remotely via network 204. Once received at server 206, reception module 104 may determine that request 210 requests that data file 212 be restored to a particular point in time. The term "point in time," as used herein, generally refers to any specified day, hour, minute, etc. As an example, the particular point in time within request 210 may specify a date in the past, such as "1/2/15." In another example, the particular point in time may be the current time (i.e., request 210 may request the most up-to-date version of data file 212).

Request 210 may include any additional information, such as the user that initiated request 210 and/or a purpose for requesting the restored data file. In an exemplary embodiment, reception module 104 may determine that request 210 initiates provisioning a copy of an ORACLE database for software testing, development, data recovery, or a similar purpose.

At step 304, one or more of the systems described herein may, in response to the request, access, in a storage device, (1) a backup copy of the data file that represents the data file at a time prior to the particular point in time and (2) at least one log of actions performed on the data file after the backup copy of the data file was created. For example, in response to request 210, access module 106 may, as part of server 206 in FIG. 2, access, in storage device 208, backup copy of the data file 214 and one or more of logs 216(1)-(N).

The systems described herein may access a backup copy of the data file and one or more logs of actions performed on the data file in a variety of ways. In some examples, access module 106 may access a backup image within storage device 208 that contains backup copy of the data file 214 and logs 216(1)-(N). In one example, the backup image may be used to provision copies of a database, such as an ORACLE database. In this example, backup copy of the data file 214 may indicate the values within each block of the database when the database was first created. In addition, logs 216(1)-(N) may store each change made to the blocks within the database, as well as the day and/or time at which the changes were made.

As an example, FIG. 4 illustrates log 216(1) and log 216(2). In this example, each block within logs 216(1) and 216(2) may store an action that was performed on a block of data file 212, the block of data file 212 on which the action was performed, and the date on which the action was performed. Specifically, in this example, data file 212 (and therefore backup copy of the data file 214) may have been created on 1/1/15. As shown in FIG. 4, log 216(1) and 216(2) may describe the actions that were performed on blocks 0-9 of data file 212 between the dates of 1/1/15 and 1/5/15. Log 216(1) may contain 6 blocks that describe actions A-F and log 216(2) may contain 6 blocks that describe actions G-L.

In some embodiments, access module 106 may detect an attempt by a copy data management system within server 206 to access backup copy of the data file 214 and/or logs 216(1)-(N). For example, storage device 208 may store and manage backup images of multiple data files within a file system. Access module 106 may monitor input/output through the file system to determine that a copy data management system is reading portions of the backup image that stores backup copy of the data file 214 and logs 216(1)-(N). In other embodiments, access module 106 may query or search storage device 208 to directly identify backup copy of the data file 214 and/or logs 216(1)-(N) within storage device 208.

In some examples, after accessing backup copy of the data file 214 and logs 216(1)-(N), the systems described herein may restore data file 212 to the particular point in time. For example, restoration module 110 may identify each block within logs 216(1)-(N) that describes an action performed on data file 212 up until the particular point in time. Restoration module 110 may then apply, in chronological order, each action to backup copy of the data file 214. Specifically, restoration module 110 may add, remove, or alter blocks within backup copy of the data file 214 until the state of backup copy of the data file 214 is consistent with the state of data file 212 at the particular point in time. In some embodiments, the systems described herein may then output (via, e.g., network 204) the restored version of data file 212 to computing device 202 and/or a user that initiated request 210.

At step 306, one or more of the systems described herein may store, in a section of memory that has a faster access time than the storage device, a location of each action within the log that was performed on the data file up until the particular point in time. For example, storage module 108 may, as part of server 206 in FIG. 2, store, within section of memory 218, a location of each action within logs 216(1)-(N) that was performed on data file 212 up until the particular point in time.

The systems described herein may store a location of each action that was performed on the data file in a variety of ways. In some examples, storage module 108 may first identify the location of each action. For example, storage module 108 may read and/or analyze one or more of logs 216(1)-(N) within storage device 208 to identify specific locations (e.g., blocks) within logs 216(1)-(N) that contain actions that were performed on data file 212 up until the particular point in time.

Alternatively, storage module 108 may monitor a file system within storage device 208 to determine which blocks within logs 216(1)-(N) are accessed by a copy data management system while the copy data management system restores data file 212. For example, after access module 106 detects that the backup image of data file 212 is accessed within a file system of storage device 208, storage module 108 may continue to monitor all I/O through the file system to identify each accessed block.

After identifying each accessed block of logs 216(1)-(N), storage module 108 may create a block map that associates each accessed block of logs 216(1)-(N) with a time at which the action described in the block was performed and/or data file 212. Storage module 108 may then store the block map within section of memory 218. Section of memory 218 may represent any type or portion of storage that has (or may be loaded into a memory that has) a faster access time than the memory used to store the backup image of data file 212. In some examples, section of memory 218 may represent a cache or a portion of Random Access Memory (RAM) within storage device 208 and/or server 206. Alternatively, section of memory 218 may represent a separate physical device, such as an external hard disk drive or solid state drive.

As an example, FIG. 5 illustrates section of memory 218 populated with a portion of the log blocks illustrated within FIG. 4. In this example, section of memory 218 may be created in response to request 210 requesting to restore data file 212 to the state of data file 212 on 1/2/15. As such, section of memory 218 may include each block within log 216(1) and log 216(2) that store actions performed on data file 212 up until 1/2/15. Specifically, section of memory 218 may include block 0, block 2, and block 5 within log 216(1) and block 2 and block 5 within log 216(2). In addition, section of memory 218 may associate each log block with a date at which the corresponding action was performed.

In addition to or instead of storing the locations of blocks within logs 216(1)-(N) within section of memory 218, storage module 108 may store the actual data within the blocks. For example, storage module 108 may identify and store each action and the corresponding block of data file 212 within section of memory 218. In general, storage module 108 may populate section of memory 218 with any data within with logs 216(1)-(N) that may increase the efficiency of subsequently restoring data file 212 to an additional point in time.

At step 308, one or more of the systems described herein may, when restoring the data file to an additional point in time, access at least a portion of the locations in the section of memory to identify at least a portion of the actions required to restore the data file to the additional point in time. For example, when restoring data file 212 to an additional point in time, restoration module 110 may, as part of server 206 in FIG. 2, access at least a portion of the locations in section of memory 218 to identify at least a portion of the actions required to restore data file 212 to the additional point in time.

The systems described herein may access the locations within the section of memory in a variety of ways. In some examples, restoration module 110 may receive an additional request (similar to request 210) to restore data file 212 to the additional point in time. In one embodiment, the additional point in time may be the same point in time as the particular point in time within request 210. However, the additional request may request to restore data file 212 for a different purpose than request 210. For example, request 210 may request to restore data file 212 to the particular point in time for software development, while the additional request may request to restore data file 212 to the same point in time for software testing. In other examples, the additional request may request to restore data file 212 to a point in time that is either prior to or later than the particular point in time within request 210.

After receiving the additional request, restoration module 110 may access all or a portion of section of memory 218. For example, restoration module 110 may load section of memory 218 into a main (e.g., fast) memory of server 206. Restoration module 110 may then read each block of section of memory 218 that is associated with a time or date up to the additional point in time (i.e., to identify each block within logs 216(1)-(N) required to restore data file 212 to the additional point in time). Next, restoration module 110 may read each required block within logs 216(1)-(N) to identify each action to apply to backup copy of the data file 214. In some examples, identifying each required block within section of memory 218 may reduce the need for restoration module 110 and/or a copy data management system to randomly read blocks within storage device 208 to identify the required blocks. Furthermore, in the event that section of memory 218 stores the actual actions from logs 216(1)-(N) that were performed on data file 212, restoration module 110 may entirely avoid accessing storage device 208. As such, the systems described herein may reduce the time and/or computing resources involved in performing multiple restorations of data file 212.

Figure 6:
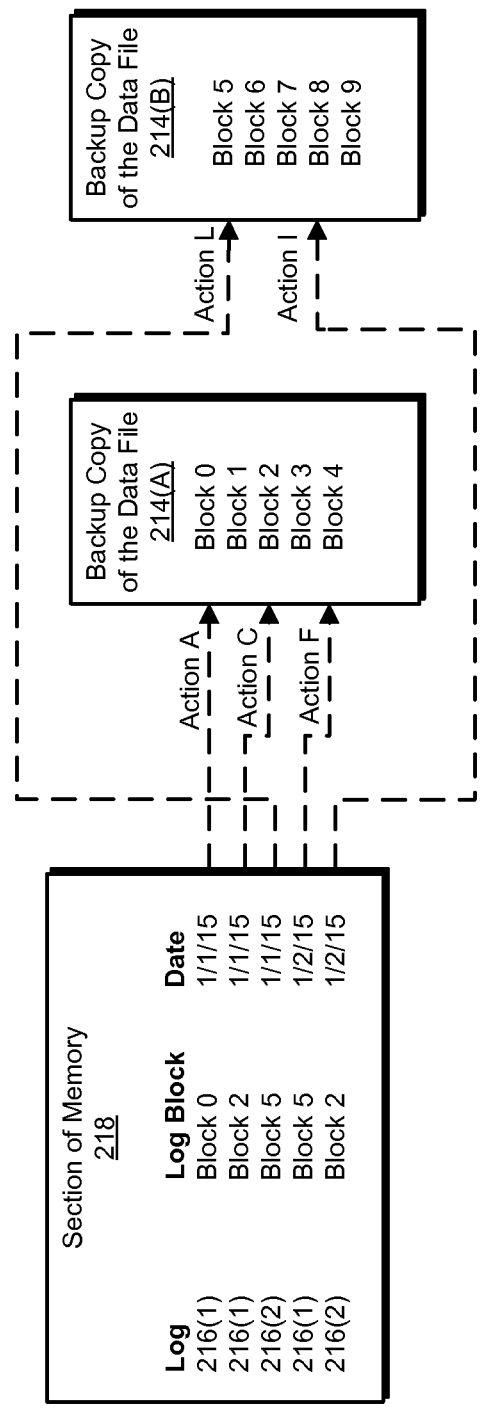
FIG. 6 is an illustration of an exemplary data file being restored using the locations of actions stored within a section of memory.

As an example, FIG. 6 illustrates how section of memory 218 shown in FIG. 5 may be used to restore data file 212 to the additional point in time. In this example, backup copy of the data file 214 may be stored across two files: backup copy of the data file 214(A) and 214(B), containing blocks 0-4 and 5-9, respectively. Also in this example, the additional request may request to restore data file 212 to 1/3/15. As section of memory 218 stores blocks of logs 216(1) and 216(2) associated with dates up to 1/2/15, restoration module 110 may apply each action indicated within section of memory 218 to backup copy of the data file 214(A) and 214(B).

Specifically, after loading section of memory 218 into a main memory of server 206, restoration module 110 may access block 0 within log 216(1). As shown in FIG. 4, block 0 of log 216(1) may indicate that action A was performed on block 0 of data file 212. As illustrated by a dashed arrow in FIG. 6, restoration module 110 may perform action A on block 0 of backup copy of the data file 214(A). Restoration module 110 may then repeat the process of identifying and applying actions (i.e., actions C, L, F, and I) to backup copy of the data file 214(A) and 214(B).

Because the additional point in time (i.e., 1/3/15) is later than the particular point in time (i.e., 1/2/15), section of memory 218 may not store the location of each block required to restore data file 212 to the additional point in time. As such, restoration module 110 may access logs 216(1)-(N) in storage device 208 to identify each additional required action (i.e., each action performed on date 1/3/15). However, storing a portion of the required blocks within section of memory 218 may still reduce the time required to restore data file 212 to the additional point in time. After identifying all additional required blocks within logs 216(1)-(N), restoration module 110 may update section of memory 218 to include the additional blocks and/or dedicate a separate portion of memory to store the additional blocks.

In some embodiments, the additional point in time may be prior to the particular point in time. As an example, the additional point in time may be 1/1/15. As such, restoration module 110 may identify each required block (i.e., the three blocks within section of memory 218 that are associated with the date 1/1/15) directly within section of memory 218. In the event that section of memory 218 stores each required action (instead of only storing blocks of logs 216(1)-(N)), restoration module 110 may completely avoid reading from storage device 208.

Furthermore, in some examples, after restoring data file 212 to the additional point in time, the systems described herein may then output (via, e.g., network 204) the restored version of data file 212 to computing device 202 and/or a user that initiated request 210.

In some embodiments, storage module 108 may maintain section of memory 218 in a predetermined location and/or for a predetermined length of time. For example, storage module 108 may store section of memory 218 within server 206 for 1 hour, 1 day, etc. Alternatively, storage module 108 may store section of memory 218 until after restoration module 110 uses section of memory 218 to restore data file 212 to the additional point in time. Storage module 108 may then delete or erase section of memory 218 (e.g., in order to create storage space for blocks of logs associated with a different data file). In another example, storage module 108 may designate multiple portions of memory for storing blocks of logs associated with frequently-requested data files.

The systems described herein may be implemented in a variety of ways and provide a number of advantages. As explained above, after receiving a request to restore a data file to a particular point in time, the systems and methods described herein may access a backup copy of the data file and one or more archived logs that store actions that were performed on the data file after the backup copy was created. Then, the disclosed systems and methods may identify (by, e.g., intercepting file system I/O) the location of each action within the archived logs that is applied to the backup copy to restore the data file to the particular point in time.

By storing each identified location (and/or each action) in a section of memory that has a faster access time than the storage device that stores the backup copy and the archived logs, the systems and methods described herein may efficiently restore the data file to the same or an additional point in time. For example, in response to a request to restore the same data file to another point in time, the disclosed systems and methods may quickly identify, within the fast-access section of memory, the location of at least a portion of the actions required to restore the data file. As such, the systems and methods described herein may increase the speed and efficiency of restoring data files by decreasing the time spent searching through archived logs in a storage device.

Figure 7:
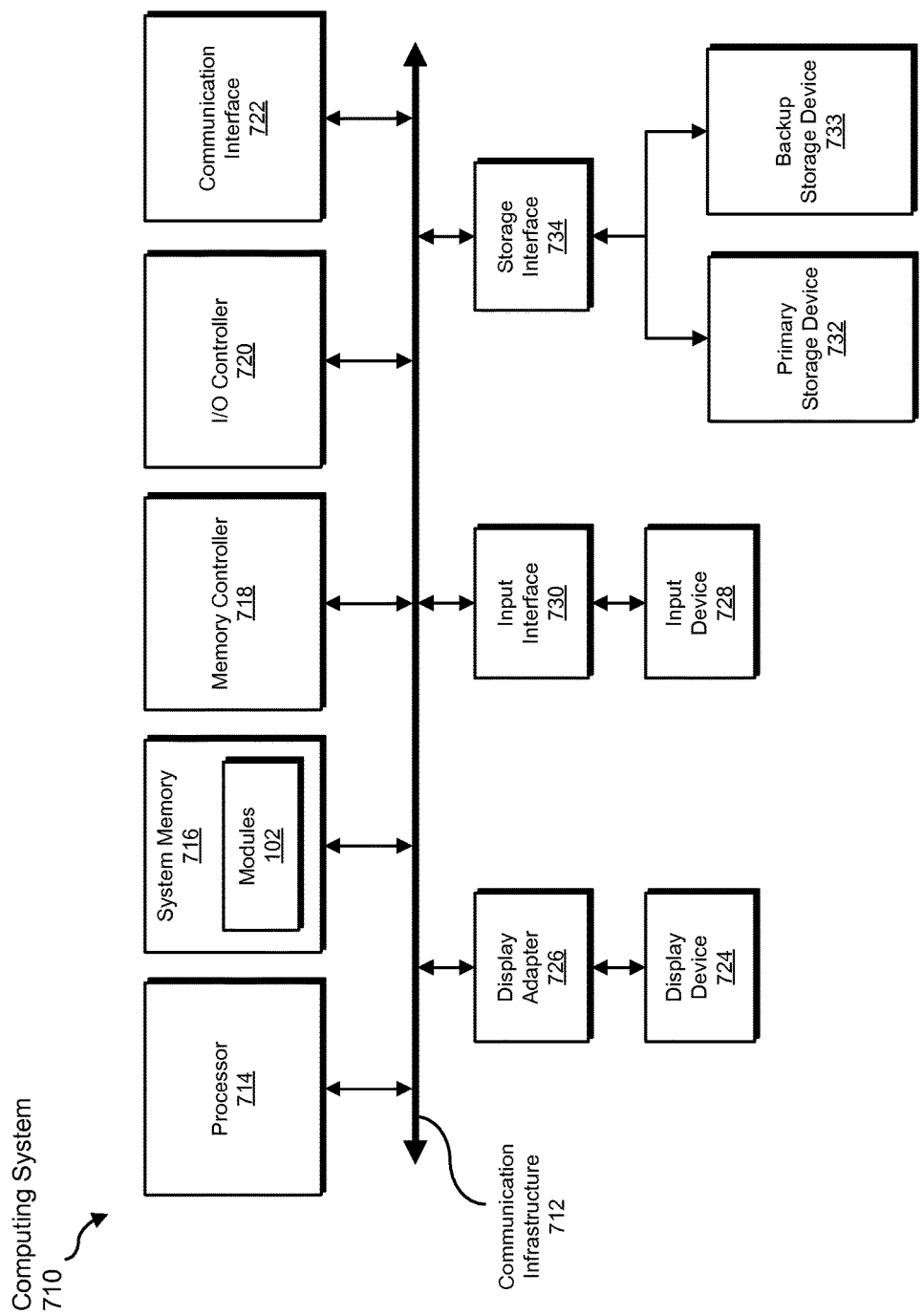
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
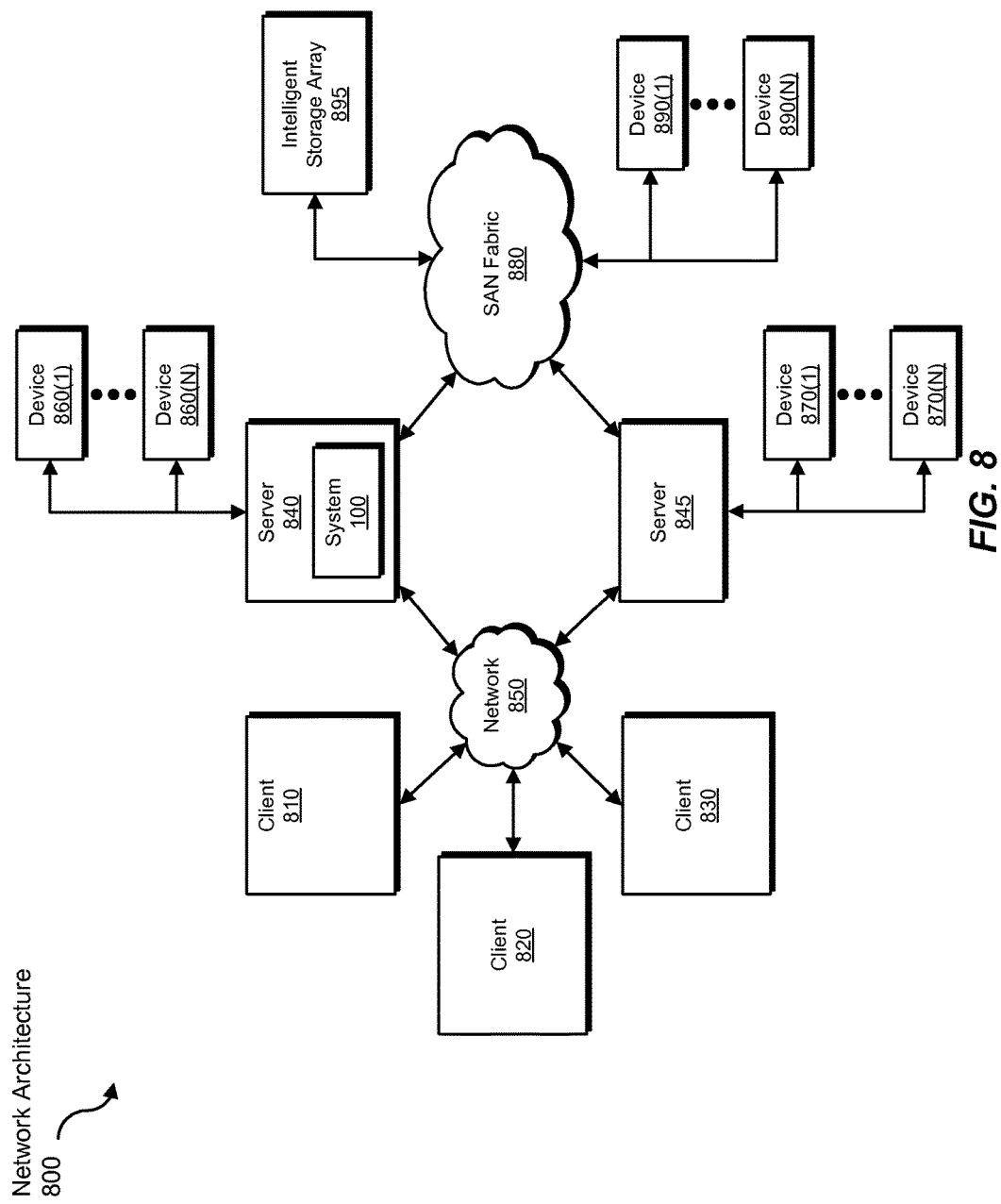
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for restoring data files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data file to be transformed, transform the data file, output a result of the transformation to a user or computing device, use the result of the transformation to restore the data file to a particular point in time, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restoring data files, at least a portion of the method being performed by a computing device comprising at least one processor, the method comprising:
receiving a request to restore a data file to a particular point in time;
in response to the request, accessing, in a storage device:
a backup copy of the data file that represents the data file at a time prior to the particular point in time; and
at least one log of actions performed on the data file after the backup copy of the data file was created;
identifying a location of each action within the log that was performed on the data file up until the particular point in time by monitoring input and output through a file system within the storage device that stores the backup copy of the data file and the log of actions performed on the data file;
storing each identified location within a section of memory that has a faster access time than the storage device; and
when restoring the data file to an additional point in time, accessing at least a portion of the locations in the section of memory to identify at least a portion of the actions required to restore the data file to the additional point in time.

2. The method of claim 1, wherein:
the data file comprises a database; and
the log of actions performed on the data file comprises a log of changes made to blocks within the database.

3. The method of claim 1, wherein:
the storage device comprises a disk; and
the section of memory comprises a cache.

4. The method of claim 1, wherein storing the location of each action that was performed on the data file comprises associating each location with a time at which the action was performed.

5. The method of claim 1, wherein restoring the data file to the additional point in time comprises applying the portion of the actions to the data file.

6. The method of claim 1, wherein the additional point in time comprises a point in time prior to the particular point in time.

7. The method of claim 1, wherein the additional point in time comprises a point in time later than the particular point in time.

8. A system for restoring data files, the system comprising:
a reception module, stored in memory, that receives a request to restore a data file to a particular point in time;
an access module, stored in memory, that in response to the request, accesses, in a storage device:
a backup copy of the data file that represents the data file at a time prior to the particular point in time; and
at least one log of actions performed on the data file after the backup copy of the data file was created;
a storage module, stored in memory, that:
identifies a location of each action within the log that was performed on the data file up until the particular point in time by monitoring input and output through a file system within the storage device that stores the backup copy of the data file and the log of actions performed on the data file; and
stores each identified location within a section of memory that has a faster access time than the storage device;
a restoration module, stored in memory, that when restoring the data file to an additional point in time, accesses at least a portion of the locations in the section of memory to identify at least a portion of the actions required to restore the data file to the additional point in time; and
at least one physical processor configured to execute the reception module, the access module, the storage module, and the restoration module.

9. The system of claim 8, wherein:
the data file comprises a database; and
the log of actions performed on the data file comprises a log of changes made to blocks within the database.

10. The system of claim 8, wherein:
the storage device comprises a disk; and
the section of memory comprises a cache.

11. The system of claim 8, wherein the storage module stores the location of each action that was performed on the data file by associating each location with a time at which the action was performed.

12. The system of claim 8, wherein the restoration module restores the data file to the additional point in time by applying the portion of the actions to the data file.

13. The system of claim 8, wherein the additional point in time comprises a point in time prior to the particular point in time.

14. The system of claim 8, wherein the additional point in time comprises a point in time later than the particular point in time.

15. A non-transitory computer-readable medium comprising one or more computer-executable instructions that, when executed by at least one processor of a computing device, cause the computing device to:

receive a request to restore a data file to a particular point in time;

in response to the request, access, in a storage device:

a backup copy of the data file that represents the data file at a time prior to the particular point in time; and at least one log of actions performed on the data file after the backup copy of the data file was created;

identify a location of each action within the log that was performed on the data file up until the particular point in time by monitoring input and output through a file system within the storage device that stores the backup copy of the data file and the log of actions performed on the data file;

store each identified location within a section of memory that has a faster access time than the storage device; and when restoring the data file to an additional point in time, access at least a portion of the locations in the section of memory to identify at least a portion of the actions required to restore the data file to the additional point in time.

16. The computer-readable medium of claim 15, wherein:

the data file comprises a database; and the log of actions performed on the data file comprises a log of changes made to blocks within the database.

17. The computer-readable medium of claim 15, wherein:

the storage device comprises a disk; and the section of memory comprises a cache.

\* \* \* \* \*